Figure 8:
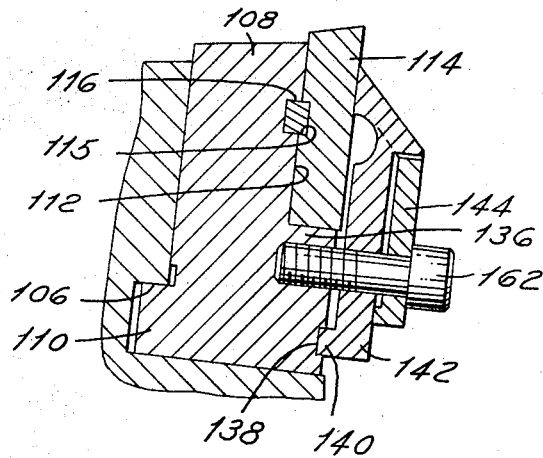

United States Patent [19]
Bartoszevicz et al.

[11] 3,780,409
[45] Dec. 25, 1973

[54] THREADING TOOL

[75] Inventors: Joseph G. Bartoszevicz; George H. Murphy, Jr.; Frederick W. Schmidt, all of Plantsville, Conn.

[73] Assignee: Fansteel Inc., North Chicago, Ill.

[22] Filed: Feb. 19, 1971

[21] Appl. No.: 116,912

[52] U.S. Cl. .......................................... 29/97, 29/96
[51] Int. Cl. ............................................. B26d 1/00
[58] Field of Search ............................. 29/96, 97, 98

[56] References Cited
UNITED STATES PATENTS

| | | | |
|---|---|---|---|
| 2,954,570 | 10/1960 | Couch | 29/97 X |
| 3,466,721 | 9/1969 | Binns | 29/97 |
| 3,017,912 | 1/1962 | Sybertz et al. | 29/96 X |
| 1,115,024 | 10/1914 | Rice | 29/97 X |
| 2,289,155 | 7/1942 | Weidauer | 29/97 |
| 2,861,322 | 11/1958 | Benes et al. | 29/97 |
| 3,180,006 | 4/1965 | Emmons | 29/97 |
| 3,371,567 | 3/1968 | Davis | 29/97 |
| 3,436,799 | 4/1969 | Kopy | 29/96 |
| 3,455,002 | 7/1969 | Miller | 29/97 |

FOREIGN PATENTS OR APPLICATIONS

| | | | |
|---|---|---|---|
| 15,216 | 3/1916 | Great Britain | 29/97 |
| 24,399 | 11/1906 | Great Britain | 29/97 |
| 130,717 | 7/1919 | Great Britain | 29/97 |
| 913,129 | 5/1946 | France | 29/97 |
| 916,457 | 8/1946 | France | 29/97 |
| 1,204,054 | 8/1959 | France | 29/96 |

*Primary Examiner*—Harrison L. Hinson
*Attorney*—Barnes, Kisselle, Raisch & Choate

[57] ABSTRACT

A threading tool for providing a simultaneous cut in a plurality of adjacent grooves of a thread to enable a progressive cut to be taken with the light cut in each groove permitting a full thread depth to be cut with one pass along a turning cylindrical workpiece. The invention includes a means for presenting an array of cutting inserts at the proper angle to provide for the proper cut, at the same time setting up a proper plunge clearance for the cutting teeth with an independent pressure locator on each tooth in the form of an interdigital clamp designed to exclude the collection of chips and dust.

6 Claims, 12 Drawing Figures

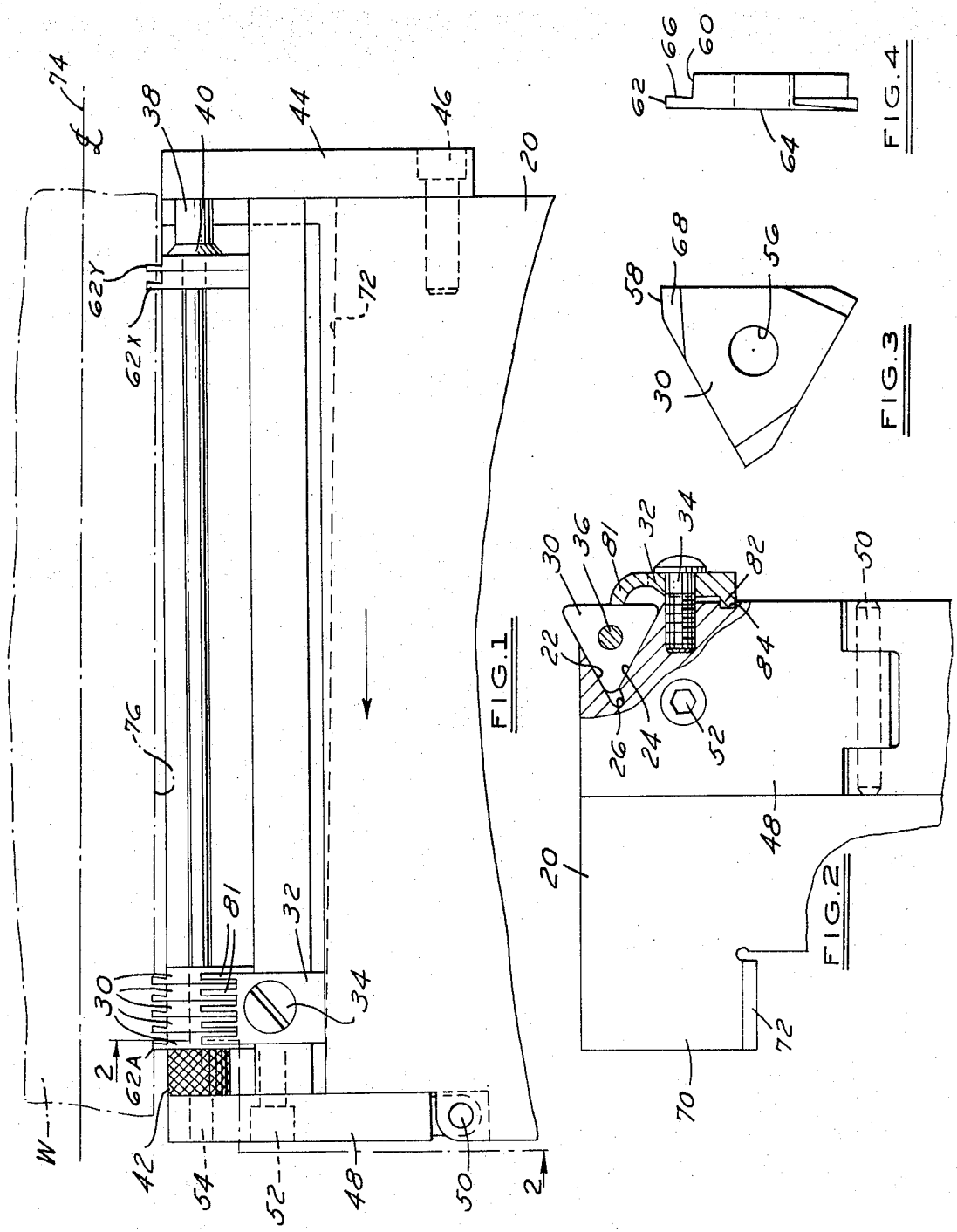

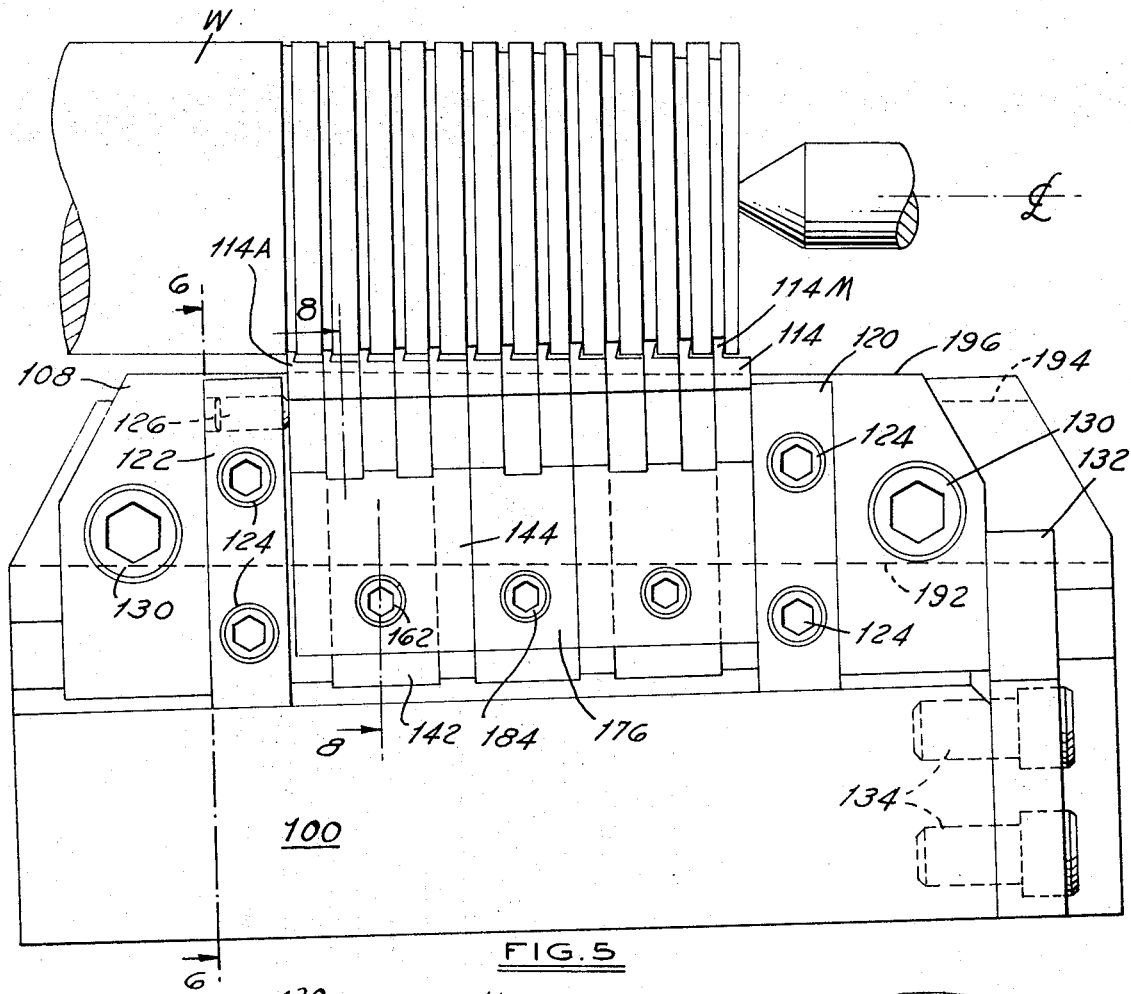
FIG. 5
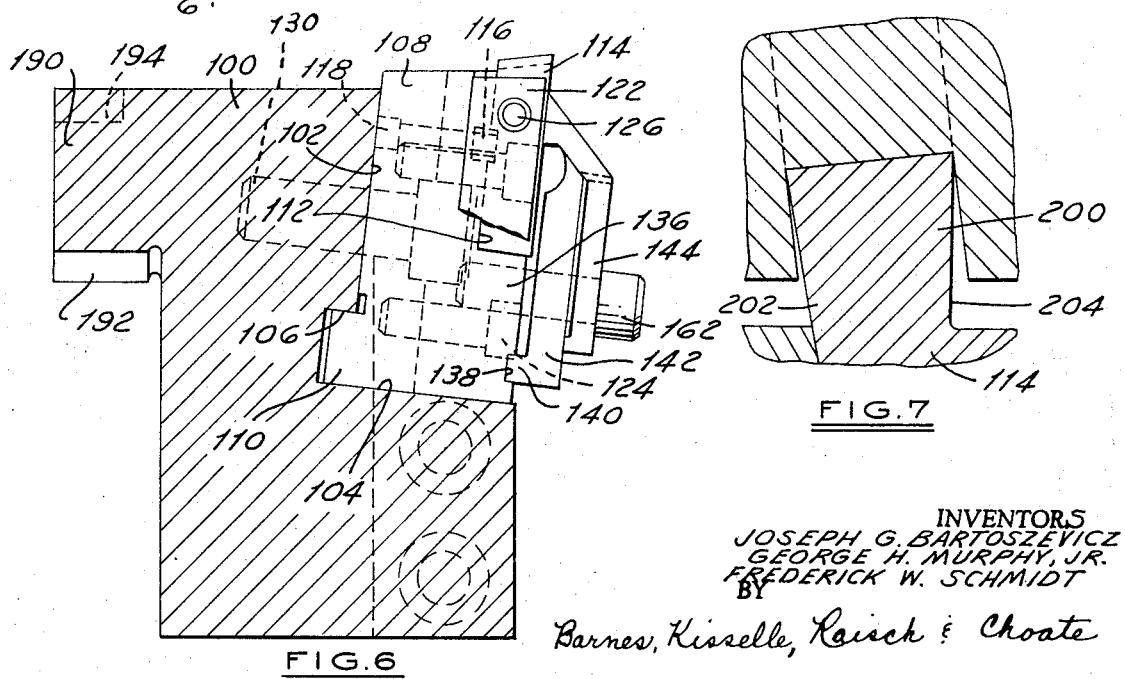
FIG. 6
FIG. 7

3,780,409

THREADING TOOL

This invention relates to a Threading Tool and more particularly to a tool for putting threads in cylindrical pieces which are turned by a power lathe.

In connection with the cutting of threads, particularly in large diameters with a fairly deep threading, it has been common to utilize a single point tool in order to provide the prescribed accuracy and it has been essential to avoid the necessity of heavy cuts on the particular tool point. This simple pass of the tool with a reasonable cut for each pass takes a considerable amount of time and, since, the work must be done by a plurality of cuts, the accuracy and the finish are not optimum.

The present invention contemplates a tool construction wherein a tool with multiple inserts properly constructed is disposed adjacent a rotating workpiece and moved along the workpiece in such a way that each particular cutter of a plurality of banked cutters takes a light cut sequentially to insure a relatively light cutting load on each cutting insert, while achieving the entire depth of cut in one pass along the part being threaded.

In connection with the design of a tool for accomplishing the purpose, it is necessary to provide a holder in which a plurality of tools can be disposed at the same angle in very close relationship, these being held by a plurality of special clamps to prevent vibration and the inserts being shaped in such a way and disposed relative to the work in such a manner that suitable side clearance is provided for the cutting inserts and suitable clearance is provided for any particular helix angle in the part being threaded.

The tool holder combination to be described can be used for parts which are large in diameter and length, for example, in the neighborhood of 20 to 30 feet. In one example, where a part needed 50 different passes with a single point tool, it was possible to do the job with one pass and reduce the cutting time from 125 hours to approximately 8 hours.

It is thus an object of the invention to provide a cutting tool assembly which can accomplish the improved threading in much reduced time without departing from the desirable condition of a reasonably light cut for each particular cutting point.

Other object and features of the invention relating to details of construction and operation will be apparent in the following description and claims in which examples of the best mode presently contemplated for the invention are set forth together with the principles of use and operation.

Drawings accompany the disclosure and the various views thereof may be briefly described as:

FIG. 1, a plan view of an assembly utilizing the principles of the invention.

FIG. 2, a sectional view on line 2—2 of FIG. 1.

FIG. 3, an elevation of an individual cutter used in the assembly.

FIG. 4, a side view of a cutter.

FIG. 5, a plan view of a modified cutter combination.

FIG. 6, an end view on line 6—6 of FIG. 5.

FIG. 7, an enlarged view showing the relationship of a cutting point of the cutter to the work.

FIG. 8, a sectional view on line 8—8 of FIG. 5.

Figure 9:
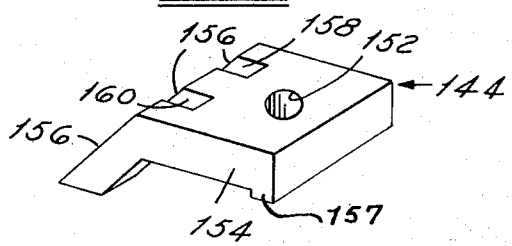

FIG. 9, a view of one part of an insert holding clamp.

Figure 10:
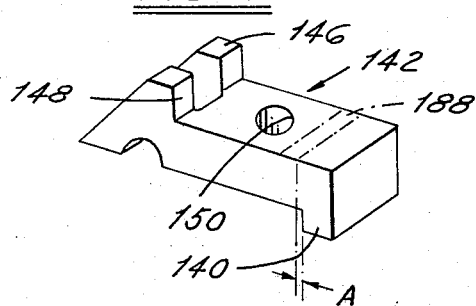

FIG. 10, a view of an interfitting second part of an insert holding clamp.

Figure 11:
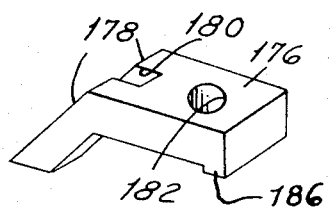

FIG. 11, a view of a modified holding clamp.

Figure 12:
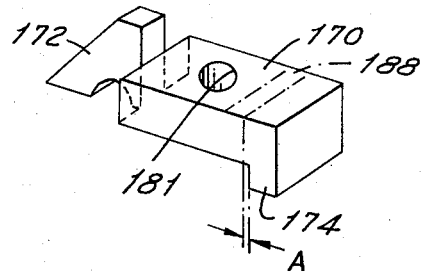

FIG. 12, a view of an interfitting holding clamp to be used with the modification of FIG. 11.

REFERRING TO THE DRAWINGS

In FIG. 1, the combination of the tool holder and tool holder inserts are shown in conjunction with a workpiece. A main body 20 has a milled groove in the upper forward corner as illustrated in FIG. 2, this groove having one milled surface 22 disposed at an angle of 120° to a second milled surface 24. A relief slot 26 is provided at the juncture of these two surfaces, and it will be seen that the milled groove or recess than holds a plurality of triangular inserts 30 which are held in place by a clamp 32 and a screw 34. It will be apparent that these triangular inserts are indexable so that each may have three cutting tips presentable sequentially to the cutting position after a predetermined amount of wear.

The inserts are centrally apertured so that they thread over a retaining rod 36, which has a knurled lock nut 38 at one end bearing against a washer 40 and a retaining head 42 at the other end. This method of retention permits simultaneous insertion, removal, and indexing of the triangular inserts.

At the right-hand end of the assembly as viewed in FIG. 1 is a retaining end plate 44 held against the body 20 by suitable bolts 46. At the other end of the body is a retaining end plate 48 hinged on a pin 50 so that it may be swung away from the end of the insert recess. This plate is held in place by a bolt 52. In the top part of the end plate 48 is a set screw 54 which can be used to urge the head of the retaining rod 36 against the retaining washer 40 to lock the rod securely in place.

The inserts 30 are shown in detail in FIGS. 3 and 4. They have a triangular configuration with a central hole 56 with ground-off corners 58 and ground away portions terminating at a shoulder 60 leaving a cutting tooth portion 62 which has one side surface parallel with a wall 64 of the insert and another portion angled slightly at 66 to provide clearance as is illustrated in FIG. 7 later to be described. This projecting tooth portion 62 also has a side grind 68 to compensate for the helix angle to be cut. Thus, the teeth 30 are stacked side-by-side as shown in FIG. 1 from one end to the other of the retaining rod 36 so that the cutting teeth 62 project outwardly from the body portion. The body portion 20 has an integral extension bar 70 shown at the left in FIG. 2, this bar having an angled surface 72 which is shown in a dotted line in FIG. 1. This angled surface when mounted parallel to the axis 74 of a workpiece W presents the teeth 62 at an angle to the outer cylindrical surface 76 of the workpiece which is rotating with the top toward the tool holder.

Thus, as the toolholder is moved in the direction of the arrow relative to the workpiece, it will be seen that the tooth 62A in FIG. 1 would first contact the workpiece with a relatively light cut. The teeth progressively feed into a helix thread on the workpiece each taking the same relatively light cut until the teeth 62X and 62Y at the end of the array have completed the cutting operation of the thread. The tool holder and the plurality of cutting teeth will move by reason of a standard lead screw in the direction of the arrow relative to the rotating work until the entire piece is threaded throughout the desired length. The cocking of the tool assembly relative to the work provides clearance on the tooth on the flat side of the tool insert 30 and the angle cut at 66 provides the clearance on the other side of the cutting tooth. As described, the cutting tooth may also be provided with a side ground surface to compensate for the helix angle. In addition, the clearance for the helix angle may be provided by imparting a slight angle off the horizontal plane to the composite holder. In FIG. 1, this would mean that the right-hand end of body 20 would be higher than the left-hand end. Thus, by a relatively light cut on all teeth and with a reasonably rapid feed, the thread may be accomplished with one pass along the work.

The clamping of the teeth 30 against the surfaces 22 and 24 is accomplished by multiple finger clamps 32 having individual fingers 81 and held in place by headed screws 34. A specially designed clamp for this purpose will be later described. The clamp 80 has a heel portion 82 which engages a surface groove 84 to provide a stable location.

In FIG. 5, a modified system is illustrated wherein a similar general assembly is utilized for the cutting of a helix groove in a workpiece W. In this embodiment a body 100 has an elongated corner recess cut into its upper right-hand corner as viewed in FIG. 6 to provide a tool mount surface 102 and a tool mount surface 104 at right angles to each other, there being a groove 106 at the corner juncture of these two surfaces.

A tool mounting block 108 is provided to be mounted in the corner recess of body 100, this block having a heel portion 110 to enter and lock in the groove 106 and having a substantially rectangular recess 112 in its upper right-hand corner was viewed in FIGS. 5, 6 and 8 to receive a plurality of cutting inserts 114. These cutting inserts each have a notch 115 in the bottom portion thereof which engages an elongate key 116 held in place in an undercut groove in the block 108 by screws 118. Thus, the multiple inserts 114 are banked along the block 108 and held securely by the key 116. At each end of the recess 112 which receives these inserts is a retaining bar 120 and 122 respectively held in place by bolts 124. In the end of the bar 122 is a recessd screw 126 which can be used to apply force to the banked inserts to compact them in the holding recess 112. The block 108 is held on the body 100 by socket head bolts 130. An additional locator end block 132 is provided at the right-hand end of the tool block held in place by screws 134.

It will be noted that the bottom portion of the tool block 108, as viewed in FIG. 6, has a raised portion 136, the forward surface of which provides the back-up shoulder for the inserts 114. At the bottom of the outer surface of this raised portion is a groove 138 which extends along the block portion to serve as a retaining recess for heel portions 140 of a multiple clamp consisting of a bottom portion 142 and a top portion 144. These clamps are shown in detail in FIGS. 8 to 12.

The bottom clamp 142 has two fingers 146 and 148 which project outwardly and also have an upward riser component as shown in the drawing. A hole 150 is provided for a holding bolt. A second portion of this clamp is shown in FIG. 9 having a hole 152 and a top portion 154 with downwardly projecting fingers 156 and a rear bottom heel 157. When these clamps are assembled with the holes 150 and 152 aligned, the heel portion 140 will engage the groove 138 and the riser portions of the teeth 146 and 148 will fit in the openings 158 and 160 of the top clamp 144. This interdigitation provides a separate pressure finger for each particular insert which is being held, the clamps being retained in the tool block by a screw 162.

A series of single and double finger clamps is shown in FIGS. 11 and 12 used to compositely hold three inserts rather than five. In these figures the bottom clamp 170 has a single finger 172 with a riser portion and a heel portion 174. In FIG. 11, the top clamp 176 has two finger portions 178 and an intermediate opening 180 to receive the riser portion of the finger 172. The holes 181 and 182 will again align to be held by a locking bolt 184. A rear bottom heel 186 is provided on the top clamp and will bear against the top of clamp 170. It will be noted that each bearing heel 157 and 186 of the top clamps locates on the bottom clamps a spaced distance ahead of the termination of the bearing heel of the bottom clamps. In FIGS. 10 and 12, this bearing area is shown by the space 188 between dotted lines, and the distance "A" is shown forward of the bottom heels 140 and 174. Thus, the single clamping screws 162 and 184, respectively, will bear against each clamp with the necessary pressure on the forward clamping fingers. Thus, each insert will have a resilient pressure urging it securely into the recess between the end bars 120 and 122 and another important feature of this composite clamp structure is that the closely spaced fingers provide no spaces between the holding fingers so that chips and dust cannot enter the clamping assembly to interfere with its operation.

The tool body 100 has also a mounting projection bar 190 at the upper left-hand corner as viewed in FIG. 6, this bar having a back surface 192 which is angled along the dotted line 192 shown in FIG. 5 and the front surface of this block also has an angled surface 194 so that the block may be securely fastened with these surfaces 192 and 194 parallel to the axis of the workpiece W. The cutters 114 are, by reason of this angle, positioned such that the first cutter 114A will take a very light cut as it progresses into the work W and each succeeding cutter will also take a light cut until the cutter 114M finishes the depth of the cut required for the desired thread. One pass of the tool holder through the work actuated by a proper lead screw will make the necessary thread. It will be seen that the front surface 196 of the tool block 108 is angled to provide the necessary work clearance.

As previously described in connection with the cutting teeth of FIG. 1, there is a side clearance provided for entry into the work. The same is true of the inserts 114 wherein the cutting tooth 200 has a side 202 which is co-planar with the left-hand side of the insert and has a side 204 which is angled inwardly relative to the planar side. Thus, when the teeth are angled by reason of the mount of the body 100, there is clearance provided at each side of the insert at shown in FIG. 7. The tooth may also be ground on the side surface to provide the necessary helix clearence. The tooth clearance for the helix angle may also be provided, as described in connection with FIG. 1, by tilting block 100 from the horizontal a slight amount depending on the pitch of the thread being cut.

We claim:

1. A threading tool for cutting a helix thread on a cylindrical material which comprises:

a. a tool body having a recess to receive a bank of cutting inserts, b. a plurality of cutting inserts banked side-by-side in said recess each having a cutting tooth spaced from each adjacent tooth projecting from said body in a banked array along a cutting line, c. means for maintaining said inserts securely in said recess, d. means for mounting said body relative to a rotating workpiece wherein said bank of cutting inserts is disposed at an angle to the workpiece wherein a relative longitudinal motion between said body and said workpiece will cause a helix thread to be cut in said workpiece, each tooth carrying a relatively light load as it moves along the workpiece, the means for securing said inserts comprising a pair of end blocks located at each end of said recess in said body, one of said end blocks being pivoted on said body to facilitate removal and indexing of indexable inserts in said recess, and e. a retaining rod threaded through apertures in said inserts and means to confine said retaining rod between said end blocks.

2. A tool block for cutting a helix thread on turning cylindrical work material which comprises:

a. a tool body support to be retained on a support adjacent a cylindrical turning workpiece comprising a substantially rectangular block having a top surface, a front surface, end surfaces, and a bottom surface, said bottom surface serving to support the body, and an orientation surface lying in a plane at an angle to said top and bottom surfaces to orient the front of said body support relative to a workpiece, said body having an elongate tool recess at the top front corner shaped to receive converging edges of a plurality of identical, thin polygonal cutting inserts while permitting other converging edges to project from said body support at the conjunction of said front and top surfaces, b. a plurality of identical, thin polygonal cutting inserts in said elongate tool recess positioned side-by-side, each disposed in the same relative position to the front of said block, and c. means on said block to secure said inserts firmly in said recess, wherein disposing of said tool body at an angle to the axis of a cylindrical turning workpiece will cause progressive entry of said identical inserts in a thread turning operation as said parts are moved relative to each other along the axis of the turning workpiece.

3. A tool block for cutting a helix thread on turning cylindrical work material which comprises:

a. a tool body support to be retained on a support adjacent a cylindrical turning workpiece comprising a substantially rectangular block having a top surface, a front surface, end surfaces, and a bottom surface, said bottom surface serving to support the body, and an orientation surface lying in a plane at right angles to said top and bottom surfaces but angles relative to said front surface and said end surfaces to orient the front of said body support relative to a workpiece, said body having an elongate tool recess at the top front corner shaped to receive converging edges of a plurality of identical, thin polygonal cutting inserts while permitting other converging edges to project from said body support at the conjunction of said front and top surfaces, c. means at each end of said block to close said tool recess, d. means in said tool recess supported between said means at each end to support said inserts as a group in alignment in said tool recess, and d. means on said top surface disposed to exert pressure on each of said inserts individually to urge each said insert firmly into said recess.

4. A tool block as defined in claim 3 in which one of said means at the ends of said block comprises an end plate having a portion to overlie one end of said tool recess and another portion pivotally secured to said block at an axis spaced from said recess to permit said plate to be pivoted away from said recess during assembly or re-orientation of said tool inserts.

5. A tool block as defined in claim 3 in which the means in said tool recess supported between said end means comprises a rod threaded through holes in said inserts, adjustable means on said rod within said tool recess to exert endwise pressure on said inserts, and means at one of said end means to exert endwise pressure on said rod to rigidly secure said rod and said inserts in said recess.

6. A tool block as defined in claim 3 in which said inserts are identical in size and shape and located in said recess perpendicular to the supporting walls, each in the same relative position to the front wall of the block, and each insert having at least one cutting tip projecting from said recess, one side of said tip being normal to the walls of said recess and one side of said tip having a plunge angle backed off from said other side, wherein tilting of said inserts by the mounting means of said tool block will dispose said block at an angle to the rotation axis of the work material to dispose said cutting tips at progressively different distances from said axis while providing plunge clearance on both sides of said tip.

* * * * *